(12) United States Patent
Iwamura et al.

(10) Patent No.: US 8,094,671 B2
(45) Date of Patent: Jan. 10, 2012

(54) BASE STATION APPARATUS AND PACKET SCHEDULING METHOD

(75) Inventors: Mikio Iwamura, Yokohama (JP); Minami Ishii, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 700 days.

(21) Appl. No.: 12/159,216

(22) PCT Filed: Dec. 26, 2006

(86) PCT No.: PCT/JP2006/325974
§ 371 (c)(1),
(2), (4) Date: Oct. 1, 2008

(87) PCT Pub. No.: WO2007/077845
PCT Pub. Date: Jul. 12, 2007

(65) Prior Publication Data
US 2010/0232366 A1    Sep. 16, 2010

(30) Foreign Application Priority Data
Dec. 28, 2005    (JP) .................................. 2005-379986

(51) Int. Cl.
*H04J 12/40*    (2006.01)
(52) U.S. Cl. ......... 370/439; 370/329; 370/437; 370/468
(58) Field of Classification Search ......................... None
See application file for complete search history.

(56) References Cited

U.S. PATENT DOCUMENTS

| 2004/0214602 A1* | 10/2004 | Aoyama | 455/561 |
| 2005/0243793 A1* | 11/2005 | Kim et al. | 370/347 |

FOREIGN PATENT DOCUMENTS

| CN | 1643951 A | 7/2005 |
| JP | 10-032865 A | 2/1998 |
| JP | 11-196027 A | 7/1999 |
| JP | 11-196109 A | 7/1999 |
| JP | 2003-199165 | 7/2003 |
| JP | 2004-128989 | 4/2004 |
| JP | 2004-304411 | 10/2004 |

OTHER PUBLICATIONS

Japanese Office Action for Application No. 2005-379986, mailed on Mar. 1, 2011 (6 pages).
Patent Abstracts of Japan for Japanese Publication No. 11-196109, publication date Jul. 21, 1999 (1 page).
Patent Abstracts of Japan for Japanese Publication No. 11-196027, publication date Jul. 21, 1999 (1 page).
Patent Abstracts of Japan for Japanese Publication No. 10-032865, publication date Feb. 3, 1998 (1 page).
International Search Report w/translation from PCT/JP2006/325974 dated Apr. 24, 2007 (3 pages).

(Continued)

*Primary Examiner* — Huy Vu
*Assistant Examiner* — Dady Chery
(74) *Attorney, Agent, or Firm* — Osha • Liang LLP

(57) ABSTRACT

The object can be achieved by providing a base station apparatus with: priority calculation means configured to calculate priority of a user in packet scheduling; priority correction means configured to correct priority calculated by the priority calculation means according to a discontinuous reception state; and a scheduler configured to determine a user to which data should be transmitted based on the priority corrected by the priority correction means.

12 Claims, 3 Drawing Sheets

OTHER PUBLICATIONS

Written Opinion from PCT/JP2006/325974 dated Apr. 24, 2007 (3 pages).
3GPP TS25.308 V.6.3.0; "Overall Description"; Dec. 2004 (28 pages).
3GPP TR25.858 V5.0.0; "Physical Layer Aspects"; Mar. 2002 (31 pages).
3GPP TR.25.813, V0.1.0; "Radio Interface Protocol Aspects"; Nov. 2005 (19 pages).
3GPP TR25.814, V1.0.1; "Physical Layer Aspects for Evolved UTRA"; Nov. 2005 (72 pages).
Chinese Office Action for Application No. 200680053018.1, mailed on Jul. 19, 2011 (12 pages).
esp@cenet Patent Abstract for Chinese Publication No. 1643951, publication date Jul. 20, 2005. (1 page).

* cited by examiner

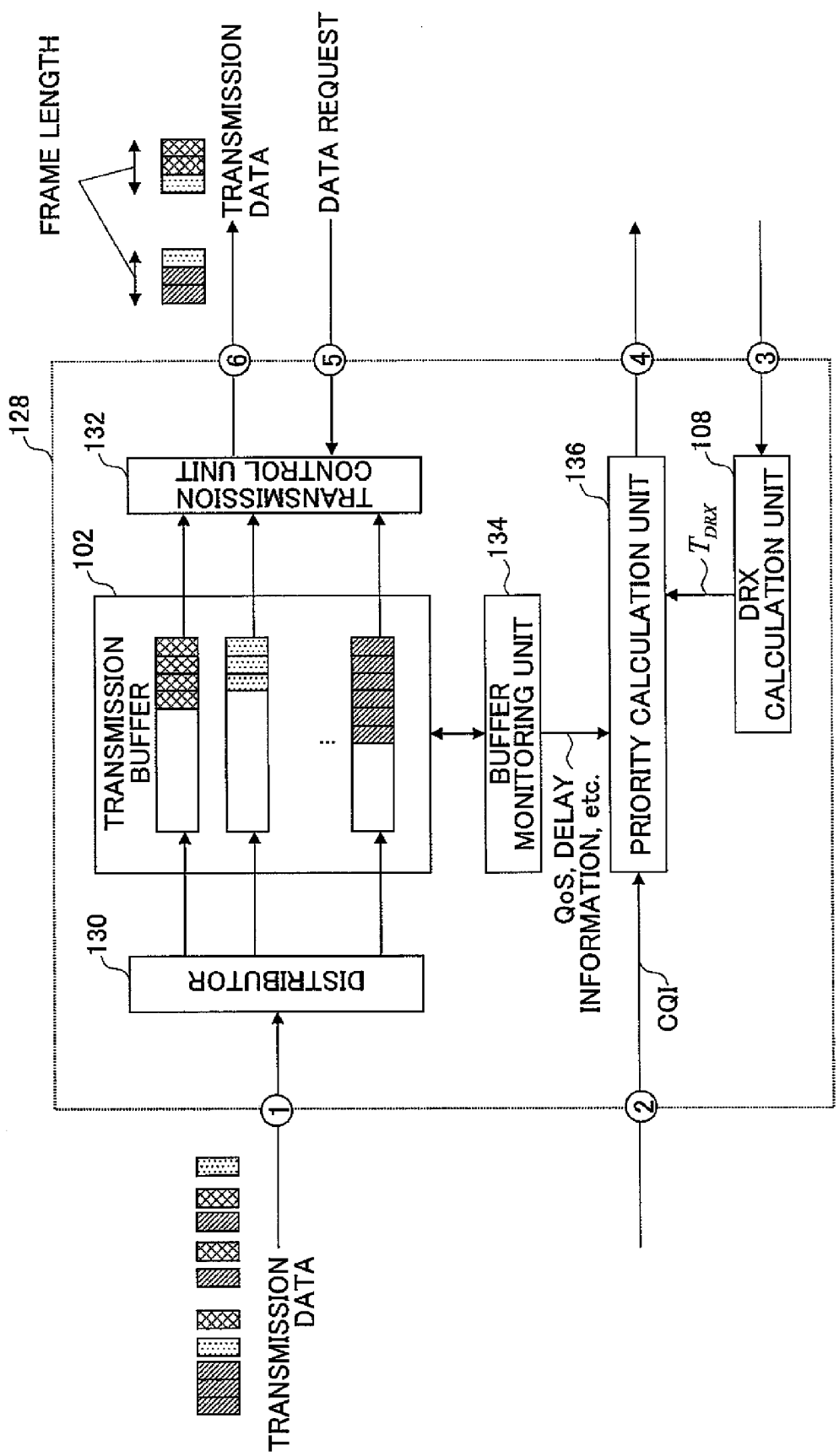

US 8,094,671 B2

BASE STATION APPARATUS AND PACKET SCHEDULING METHOD

TECHNICAL FIELD

The present invention relates to a base station apparatus and a packet scheduling method in a radio communication system including a mobile station apparatus that performs discontinuous reception.

BACKGROUND ART

Recent radio communication systems adopt a scheme for performing packet switching on a radio access interface such as Code Division Multiple Access (CDMA) and Orthogonal Frequency Division Multiplexing (OFDM) in order to flexibly support diversified services, increase compatibility with the Internet, and further to increase frequency use efficiency. High-speed Downlink Packet Access (HSDPA) standardized in 3GPP and 802.16 (WiMax) standardized in IEEE are the typical examples.

In these systems, a base station apparatus selects a user (or a plurality of users) to which a packet is to be sent next, that is, in a next frame using a common radio channel in consideration of a radio state (to be referred to as Channel Quality Indicator(CQI) hereinafter), Quality of Service (QoS), and buffer residence amount and the like of each user (mobile station apparatus). This operation is generally called packet scheduling.

For example, in HSDPA, user data (user packet) is transmitted in a time division multiplex manner on a High-speed Physical Downlink Shared Channel (HS-PDSCH) that is a common channel. HS-PDSCH is divided to frames of 2 ms, and the base station apparatus selects a user for transmitting data for each frame and transmits the data.

More particularly, for example, the base station apparatus can select a user having good CQI (Max C/I algorithm), and can select a user of good CQI (Max C/I algorithm), and can select a user in which an instantaneous value of CQI (instantaneous CQI) is relatively greater than an average value (average CQI) of CQI (Proportional Fairness(PF) algorithm). HS-PDSCH is a channel in which data of various users are time-division multiplexed, and sports high speed transmission speed of several Mb/s. Therefore, there are much wastes if all mobile station apparatuses continuously receive the HS-PDSCH. Thus, in HSDPA, the base station apparatus signals presence or absence of data on the HS-PDSCH to the mobile station apparatus using High-speed Shared Control Channel (HS-SCCH). The mobile station apparatus continuously receives HS-SCCH, and when receiving signaling indicating there is data addressed to the own apparatus, the mobile station apparatus receives HS-PDSCH.

For example, as shown on FIG. 1, in a frame at the left end, the base station apparatus signals that there is data addressed to user 1 using HS-SCCH 1, so that the user 1 receives the HS-SCCH 1, and the user 1 receives HS-PDSCH 1-5 at a next timing.

In addition, in the next frame, the base station apparatus performs signaling using HS-SCCH 1 and HS-SCCH 2 informing that there is data addressed to the user 1 and the user 2, so that the user 1 and the user 2 respectively receive HS-SCCH 1-3 and HS-SCCH 4-6 in a second frame.

By the way, a plurality of HS-PDSCHes, for example, 10 HS-PDSCHes can be established simultaneously in a same cell (sector), and it is also possible to transmit data of a single user using a same frame over a plurality of HS-PDSCHes. Also in this case, the specification is defined such that signaling can be performed for the mobile station apparatus using a single HS-SCCH.

In addition, in HSDPA, simultaneous transmission to a plurality of users is available using a plurality of HS-PDSCHes. In this case, since it is necessary to perform signaling for a plurality of mobile station apparatuses that are scheduled simultaneously, the corresponding number of HS-SCCHes are necessary. For supporting such operation form, HSDPA is specified such that the mobile station apparatus continuously receive four HS-SCCHes.

In the following, a common channel corresponding to HS-PDSCH is called SCH, and a channel corresponding to HS-SCCH is called CCH.

Here, load of a mobile station apparatus can be considerably decreased by continuously receiving a CCH, when compared with continuously receiving SCH. However, there is its receiving load so that battery is consumed. Especially, in a service in which data arrives discontinuously like web browsing, the battery is rapidly consumed if HS-SCCH is continuously monitored for a long time even though there is no data when a web page is being browsed.

The battery can be saved by once releasing a connection until data arrives, for example, until opening a next web page and entering into a waiting mode. But, according to this method, it is necessary to perform re-connection processes when data arrives so that service response is lowered.

To avoid such problem, CCH can be received discontinuously (Discontinuous Reception(DRX)). A mobile station apparatus under DRX receives CCH in a cycle (DRX cycle) (to be referred to as DRX opportunity hereinafter), and the mobile station apparatus does not receive CCH in the remaining time. By performing DRX, battery consumption due to continuously receiving CCH can be avoided.

For example, when there is no data addressed to the own mobile station apparatus for a predetermined time, the mobile station apparatus can autonomously control itself to automatically perform DRX for CCH. In addition, for example, the mobile station apparatus negotiates with a base station apparatus or a network to control itself to perform DRX for CCH.

When the mobile station apparatus performs autonomously control for DRX, the base station apparatus can determine DRX states of the mobile station apparatus by applying a similar rule. For example, in 802.16, when there is no scheduled data at a DRX opportunity, operation for doubling the DRX cycle is repeated so that further battery saving is performed by increasing the DRX cycle.

A mobile station that is once signaled that there is data using CCH at a DRX opportunity can immediately stop DRX to return to a state of CCH continuous reception. In addition, in this case, the mobile station apparatus can perform control to decrease the DRX cycle.

In addition, in a cellular system, the mobile station apparatus performs handover processes to switch base station apparatuses for connection when the user moves. For example, in a WCDMA system, the mobile station apparatus measures signals of surrounding base station apparatuses, and when a specific condition is satisfied, that is, when receiving levels are switched, for example, the handover processes are performed. Here, a WCDMA mobile station apparatus that has only one receiver cannot measure a signal having a different frequency while performing communications.

Thus, by launching a compressed mode (temporarily doubling the transmission rate to temporally compress transmission so as to generate a gap in a transmission time, that is, Discontinuous Transmission(DTX)), a gap is generated in a reception time (that is, DRX) so that the different frequency is measured in that time.

In the same way, different frequency is measured by performing DRX in HSDPA in which WCDMA is expanded to a packet switching scheme, so that the base station apparatus cannot transmit a packet to the user during the time (or, even though it sends a packet, the mobile station apparatus cannot receive the packet so that it becomes waste). This similarly applies to a case for measuring a radio wave of a different radio system. That is, when different frequency or different system are tried to be measured, it becomes necessary to perform DRX, and the base station apparatus cannot transmit data during the time.

DISCLOSURE OF THE INVENTION

Problem to be Solved by the Invention

However, the above-mentioned background art has a following problem.

A mobile station apparatus that is performing DRX can receive data only at an DRX opportunity. If the base station apparatus does not perform scheduling to send a packet to the user at the DRX opportunity, it becomes necessary that the user waits for data until a next DRX opportunity.

For example, when using a scheduler such as Max C/I or PF, if CQI of the user is not good at a DRX opportunity, transmission of an arriving packet is not performed, so that the packet cannot be transmitted for all time.

A packet that is not transmitted at a DRX opportunity is forced to have large delay. This remarkable deteriorates service response. In addition, if a packet that arrives while performing DRX is data that should be transferred with low delay due to requirement of QoS, there is a fear that critical communication quality deterioration occurs if DRX opportunity is once missed.

Therefore, there is a possibility that such delay caused by DRX not only decrease service response but also cause communication quality deterioration. Especially, when the mobile station apparatus performs DRX for measuring a different frequency or a different system, opportunity for receiving communication data is limited for the mobile station apparatus although there is communication data. As a result, there is a possibility that communication quality, that is, throughput, for example, largely decreases.

Thus, the present invention is contrived for solving the above-mentioned problem, and the object is to provide a base station apparatus and a packet scheduling method that can improve service response for a user that is performing discontinuous reception and that can decrease communication quality deterioration due to discontinuous reception.

Means For Solving The Problem

For solving the above-mentioned problem, as one feature, a base station apparatus includes:

priority calculation means configured to calculate priority of a user in packet scheduling;

priority correction means configured to correct priority calculated by the priority calculation means according to a discontinuous reception state; and a scheduler configured to determine a user to which data should be transmitted based on the priority corrected by the priority correction means.

By configuring like this, the base station apparatus can perform packet scheduling based on priority corrected according to a discontinuous reception state.

In addition, as one feature, a packet scheduling method of the present invention includes:

a CQI information obtaining step of obtaining CQI information indicating radio state of a mobile station apparatus based on a transmission signal from the mobile station apparatus;

a priority calculation step of calculating priority of a user in packet scheduling based on the CQI information;

a priority correction step of correcting priority calculated in the priority calculation step according to a discontinuous reception state; and a scheduling step of determining a user to which data should be transmitted based on the priority corrected in the priority correction step.

Accordingly, priority of transmission assignment in packet scheduling is corrected according to the discontinuous reception state, so that packet scheduling can be performed based on the corrected priority.

EFFECT OF THE INVENTION

According to an embodiment of the present invention, a base station apparatus and a packet scheduling method that can improve service response in a user while performing discontinuous reception, and that can decrease communication quality deterioration due to discontinuous reception can be realized.

BRIEF DESCRIPTION OF THE DRAWINGS

FIG. 3 is a partial block diagram of a base station apparatus according to an embodiment of the present invention.

DESCRIPTION OF REFERENCE SIGNS

100 base station apparatus

Preferred Embodiments for Carrying Out the Invention

Next, an embodiment of the present invention is described with reference to figures.

By the way, in all figures for explaining the embodiments, same symbols are used for parts having same functions, and repeated descriptions are not provided.

A radio communication system of an embodiment of the present invention includes a mobile station apparatus and a base station apparatus.

As described above, in the present embodiment, a common channel corresponding to HS-PDSCH is called SCH (shared channel), and a channel corresponding to HS-SCCH is called CCH (control channel).

The mobile station apparatus performs discontinuous reception (DRX) for CCH. In addition, the mobile station apparatus receives CCH at a period in DRX (in a DRX cycle) (to be referred to as DRX opportunity hereinafter), and does not receive CCH in remaining time. Accordingly, the mobile station apparatus can perform battery saving.

In addition, the mobile station apparatus may increase the cycle for becoming DRX gradually in a predetermined period, and may change the cycle for becoming DRX according to services.

Figure 1:
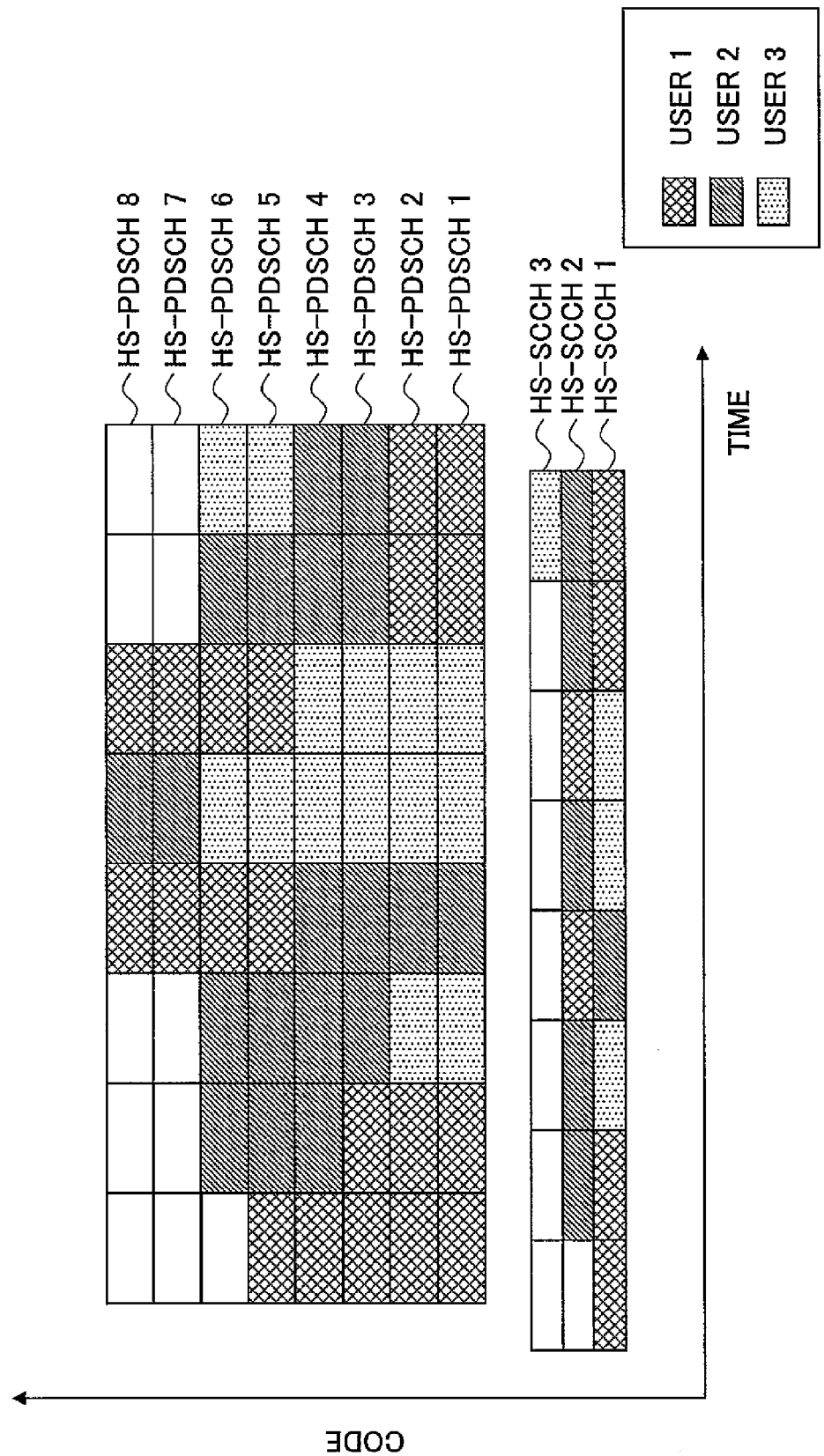
FIG. 1 is a schematic diagram indicating relationship between HS-PDSCH and HS-SCCH in HSDPA.
Figure 2:
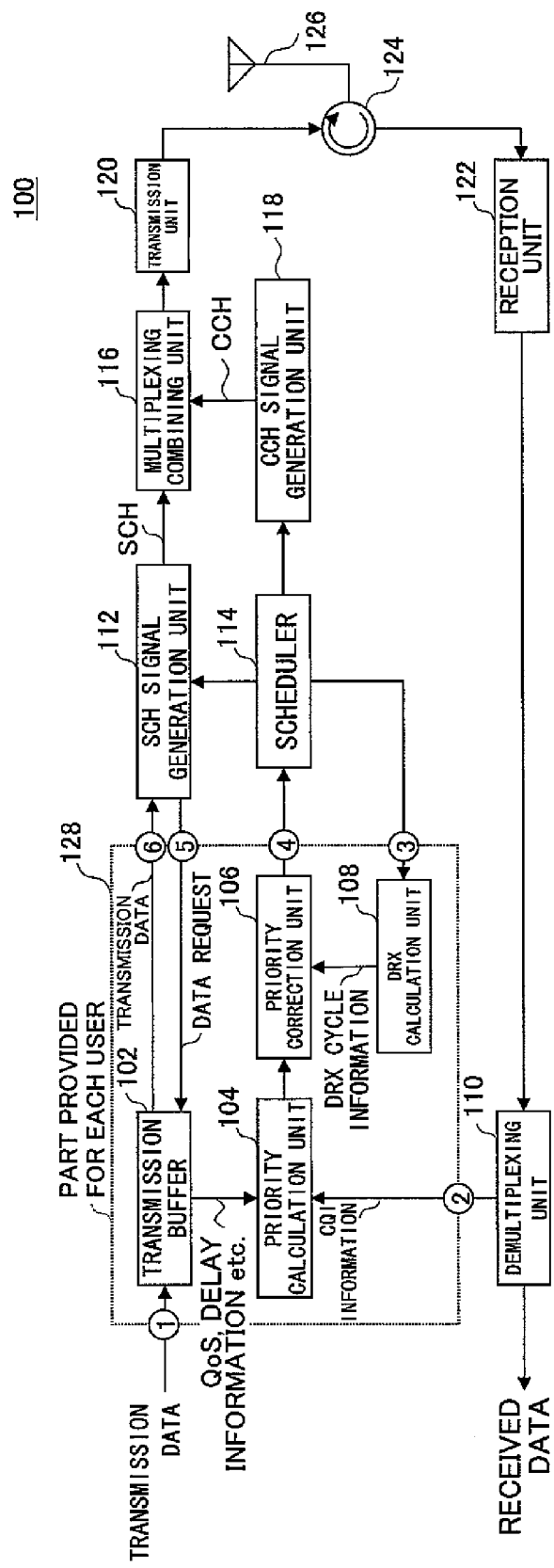
FIG. 2 is a partial block diagram of a base station apparatus according to an embodiment of the present invention.

Next, the base station apparatus 100 of the present embodiment is described with reference to FIG. 2.

The base station apparatus 100 of the present embodiment includes a transmission buffer to which transmission data is supplied, a SCH signal generation unit 112 to which the transmission data output from the transmission buffer 102 is supplied and that sends a data request to the transmission buffer 102, a multiplexing combining unit 116 to which a SCH signal output from the SCH signal generation unit 112 is supplied, a transmission unit 120 to which a signal output from the multiplexing combining unit 116 is supplied, a duplexer 123 to which a transmission signal output from the transmission unit 120 is supplied, an antenna 126 for transmitting a transmission signal output from the duplexer 124, a reception unit 122 to which a received signal output from the duplexer 124 is supplied, a demultiplexing unit 110 to which a signal output from the reception unit 122 is supplied, a priority calculation unit 104 to which QoS, delay information and the like output from the transmission buffer 102 are supplied, a priority correction unit 106 to which a signal output from the priority correction unit 104 is supplied, a scheduler 114 to which a signal output from the priority correction unit 106 is supplied, a CCH signal generation unit 118 and a DRX calculation unit 108 to which a signal output from the scheduler 114 is supplied.

The demultiplexing unit 110 outputs received data, and supplies CQI information to the priority calculation unit 104. The scheduler 114 outputs schedule information to the SCH signal generation unit 112, and the CCH signal generation unit 118 supplies CCH to the multiplexing combining unit 116. In addition, the DRX calculation unit 108 supplies DRX cycle information to the priority correction unit 106. The scheduler 114 determines one or a plurality of users to which data should be transmitted using a next SCH frame based on priority information of each user received from the priority correction unit 106. In addition, the scheduler 114 sends schedule information, that is, information indicating a selected user to the SCH signal generation unit 112, the CCH signal generation unit 118 and the DRX calculation unit 108.

The SCH signal generation unit 112 extracts data corresponding to one or a plurality of users to which data should be transmitted in a next frame from the transmission buffer 102 to generate a SCH signal based on schedule information received from the scheduler 114. That is, the SCH signal generation unit 112 supplies information indicating data request to the transmission buffer 102 to generate the SCH signal using transmission data supplied from the transmission buffer 102. For example, the SCH signal generation unit 112 performs coding process, CRC adding process and the like. The SCH signal generation unit 112 outputs the generated SCH signal to the multiplexing combining unit 116.

The CCH signal generation unit 118 generates a CCH signal based on the schedule information received from the scheduler 114, and supplies it to the multiplexing combining unit 116. The CCH signal mainly includes information indicating presence or absence of data on the SCH. In addition, the CCH signal may include information indicating a coding method of the SCH signal, for example.

The multiplexing combining unit 116 multiplexing combines the SCH signal received from the SCH signal generation unit 112 and the CCH signal received from the CCH signal generation unit 118, and supplies the combined signal to the transmission unit 120.

The transmission unit 120 converts the signal that is supplied from the multiplexing combining unit 116 and that are obtained by multiplexing combining the SCH signal and the CCH signal into an RF signal, and amplifies the RF signal to excite the antenna.

The mobile station apparatus detects the state (CQI) of the radio channel based on the common pilot signal transmitted from the base station apparatus 100 to report the CQI using an uplink control channel.

The reception unit 122 receives the RF signal from the mobile station apparatus, converts the signal into a baseband signal, and supplies the baseband signal to the demultiplexing unit 110.

The demultiplexing unit 110 extracts CQI information of each user from the received signal to supply the information to the priority calculation unit 104.

The transmission buffer 102 buffers user data of a downlink line. For example, when there are a plurality of data flows for one user, the transmission buffer 102 manages the plurality of flows and manages QoS information of each flow. In addition, the transmission buffer 102 may monitor amount of data resided in the buffer, delay time and the like. In addition, the transmission buffer 102 supplies QoS information, delay information, information indicating data residence amount and the like to the priority calculation unit 104. In addition, in response to the data request from the SCH signal generation unit 112, the transmission buffer 102 supplies requested transmission data to the SCH generation unit 112.

The priority calculation unit 104 calculates priority of a user in packet scheduling based on CQI information supplied from the demultiplexing unit 110, QoS information, buffer residence amount, buffer residence time that is information indicating delay time and the like that are supplied from the transmission buffer 102, and supplies information indicating the priority into the priority correction unit 106.

The DRX calculation unit 108 receives the schedule information from the scheduler 114, calculates DRX state of each user, that is, DRX cycle, for example, and supplies information indicating the DRX cycle to the priority correction unit 106.

The priority correction unit 106 corrects priority received from the priority calculation unit 104 according to the DRX state. For example, the priority correction unit 106 performs correction so as to give high priority to a user performing DRX.

When there are a mobile station apparatus that performs DRX and a mobile station apparatus that does not perform DRX, if scheduling is performed with same priority, a mobile station apparatus having good radio state is assigned. However, since time for the mobile station apparatus that performs DRX to be able to perform reception is limited, if assignment is performed to a mobile station apparatus that does not perform DRX, it becomes necessary that the mobile station apparatus performing DRX waits for a DRX cycle for receiving data. As a result, delay of data for the mobile station apparatus performing DRX occurs. When data assigned to the mobile station apparatus performing DRX is transmitted, the mobile station apparatus can change its mode from the DRX mode to a continuous reception mode. If assignment is not performed, delay becomes large so that service response becomes bad.

Accordingly, by performing correction to heighten priority of a user that performs DRX, priority of assignment can be heightened at a timing when the user that performs DRX can perform reception, so that data delay for the user performing DRX can be decreased.

In addition, the priority correction unit 106 may correct priority based on DRX cycle information supplied from the DRX calculation unit 108. For example, the priority correction unit 106 performs correction such that the longer the DRX cycle of a user is, the higher the priority of the user becomes, based on the DRX cycle information. For example, the priority correction unit 106 predetermines correction amount of priority according to DRX cycles, adds a correction amount of priority corresponding to the supplied DRX cycle information to the supplied priority, and supplies the priority to the scheduler 114. In this case, for example, correction amount for a user having a long DRX cycle is determined to be large.

A user of a short DRX cycle is likely to be assigned next. Accordingly, delay of data to be transmitted to a user having a long DRX cycle can be decreased. Thus, delay of the whole of the system can be improved.

In addition, when the mobile station apparatus is performing DRX for measuring a different frequency or a different system, the priority correction unit 106 receives information indicating that the mobile station apparatus is measuring the different frequency or the different system from an uplink control channel, for example. In this case, the priority correction unit 106 may absolutely increase priority for the mobile station apparatus.

That is, when the priority correction unit 106 receives information indicating that the mobile station apparatus is measuring the different frequency or the different system, the priority correction unit 106 sets the priority for the mobile station apparatus to be greater than priority of other mobile station apparatuses. As a result, the scheduler 114 assigns a next frame to the mobile station apparatus that is measuring the different frequency or the different system.

Accordingly, data can be transmitted, by priority, to a mobile station apparatus that is performing DRX and is measuring different frequency since it is necessary to perform handover.

By the way, in the configuration described with reference to FIG. 2, the transmission buffer 102, the DRX calculation unit 108, the priority calculation unit 104 and the priority correction unit 106 exist for each user connecting to the base station apparatus. In addition, it is not necessary to configure each unit described with reference to FIG. 2 as an individual hardware unit, and it can be also realized by software.

Next, operation of the base station apparatus 100 of the present embodiment is described with reference to FIG. 2.

The mobile station apparatus detects a state (CQI) of the radio channel based on a common pilot channel transmitted from the base station apparatus 100, and reports the CQI using an uplink control channel.

Transmission data from the mobile station apparatus is received by the reception unit 122 via the duplexer 124. The reception unit 122 supplies received data to the demultiplexing unit 110.

The demultiplexing unit 110 demultiplexer CQI information from the supplied received data to supply the CQI information to the priority calculation unit 104.

On the other hand, transmission data is supplied to the transmission buffer 102. The transmission buffer 102 supplies QoS information, delay information and information indicating data residence amount and the like to the priority calculation unit 104.

Next, the priority calculation unit 104 calculates priority of the user in packet scheduling based on QoS information, delay information, information indicating data residence amount, and CQI information, and supplies it to the priority correction unit 106.

Next, the priority correction unit 104 corrects the priority based on DRX cycle information and the like, and supplies information indicating corrected priority to the scheduler 114.

The scheduler 114 performs packet scheduling based on the supplied priority of users, determines a user to which data should be transmitted, and supplies scheduling information to the SCH signal generation unit 112, the CCH signal generation unit 118 and the DRX calculation unit 108.

Next, the SCH signal generation unit 112 sends a request for corresponding user data to the transmission buffer 102 based on the scheduling information. As a result, requested transmission data addressed to the user is supplied from the transmission buffer 102. The SCH signal generation unit 112 generates a SCH signal from the supplied transmission data to supply the SCH signal to the multiplexing combining unit 116.

On the other hand, the CCH signal generation unit 118 generates a CCH signal based on the scheduling information, and supplies the CCH signal to the multiplexing combining unit 116.

The multiplexing combining unit 116 multiplexing combines the SCH signal and the CCH signal to supply it to the transmission unit 120.

The transmission unit 120 converts the signal, supplied from the multiplexing combining unit 116, in which the SCH signal and the CCH signal are multiplexing combined into a RF signal, and amplifies the signal to excite the antenna. As a result, data is transmitted.

Next, a base station apparatus 100 of another embodiment of the present invention is described with reference to FIG. 3.

In the base station apparatus 100 of the present embodiment, configuration of the part 128 provided for each user is different from corresponding configuration of the base station apparatus described with reference to FIG. 2, that is, configurations of the transmission buffer 102, the DRX calculation unit 108, the priority calculation unit 104, and the priority correction unit 106 are different.

This part includes a distributor to which transmission data is supplied, a transmission buffer 102 to which user data output from the distributor 130 is supplied, a transmission control unit 132 to which user data output from the transmission buffer 102 is supplied, a buffer monitoring unit 134 connected to the transmission buffer 102, a priority calculation unit 136 to which QoS, delay information and the like output from the buffer monitoring unit 134 are supplied, and a DRX calculation unit 138 for supplying DRX information to the priority calculation unit 136.

The distributor 130 distributes user data arriving from the network into different flows (buffers) according to its QoS.

The transmission buffer 102 buffers the user data. For example, assuming that the number of flows is N, there are buffers of the flow number N. The number N of flows corresponds to a number of logical channels, for example.

The transmission control unit 132 packs user data into a transmission frame according to a data request received from a port (5), for example, and transmits it from a port (6), for example.

The buffer monitoring unit 134 monitors states of the transmission buffer 102, that are, residence data amount, delay time, QoS and the like, for example, and reports the result to the priority calculation unit 136.

The DRX calculation unit 108 receives scheduling information from a port (3), for example, and calculates DRX state of the user.

The priority calculation unit 136 calculates scheduling priority of the user based on information on the state of the transmission buffer 102 received from the buffer monitoring unit 134 such as QoS and delay time and the like, for example, user DRX state received from the DRX calculation unit 108 such as information on DRX cycle, for example, and CQI information. The priority calculation unit 136 outputs the calculation result of the scheduling priority to a port (4), for example.

There are various methods for calculating a priority pi of an i-th user, and the following equations (1) and (2) may be used.

$$p_i(t) = a_i \cdot (r_i(t)/R_i(t)) \cdot (d_i(t)/D_i) \cdot (T_{DRX,i}(t)/T_{DRX,max}) \quad (1)$$

$$p_i(t) = a_i \cdot (r_i(t)/R_i(t)) \cdot (d_i(t) + b_i \cdot T_{DRX,i}(t))/D_i \quad (2)$$

In the equations, $a_i$ is a coefficient according to QoS of the user, $r_i(t)$ is a transmission rate (that can be realized assuming that transmission is currently assigned) corresponding to CQI, $R_i(t)$ is a throughput until now, $d_i(t)$ is a delay time of a buffer head packet, $D_i$ is a permissible delay time, $T_{DRX,i}(t)$ is a current DRX cycle, $T_{DRX,max}$ is a maximum DRX cycle, and $b_i$ is a design parameter. The $b_i$ also can be a probability in which a user has not been assigned transmission in transmission opportunities until now, for example. All users are sorted in descending order of $p_i(t)$ based on the result so that resources are assigned (scheduled) from an upper user. By the way, calculation method for $p_i(t)$ is not limited to the above-mentioned example.

By the way, the radio communication system of the embodiment of the present invention does not necessarily use different channels of SCH and CCH. For example, the present invention can be similarly applied to a system in which CCH does not exist and SCH is directly DRX-received, so that the same effects can be obtained.

According to the radio communication system of the present embodiment, data transmission priority of a user that is performing DRX can be heightened in a communication system in which communication is performed using common resources. Especially, control can be performed such that the longer the DRX period is, the higher the priority is. In addition, control can be performed so as to heighten transmission priority of a user that is performing DRX for measuring a different frequency and a different system.

Accordingly, service response in a user performing DRX can be improved so that communication quality deterioration due to DRX can be decreased.

The present international application claims priority based on Japanese patent application No. 2005-379986, filed in the JPO on Dec. 28, 2005 and the entire contents of the Japanese patent application No. 2005-379986 is incorporated herein by reference.

INDUSTRIAL APPLICABILITY

The base station apparatus and the packet scheduling method of the present invention can be applied to a radio communication system.

The invention claimed is:

1. A base station apparatus comprising:
a control channel transmission unit configured to transmit a control channel including information that indicates presence of data addressed to a mobile station apparatus;
a priority calculation unit configured to calculate priority of a mobile station apparatus in packet scheduling;
a priority correction unit configured to correct priority calculated by the priority calculation unit according to a discontinuous reception state of a mobile station apparatus that receives the control channel discontinuously; and
a scheduler configured to determine a mobile station apparatus to which data should be transmitted based on the priority corrected by the priority correction unit,
wherein the control channel transmission unit transmits the control channel including information indicating presence of data to a mobile station apparatus that is assigned data transmission by the scheduler so as to cause the mobile station apparatus to return to a continuous reception state.

2. The base station apparatus as claimed in claim 1, wherein the priority calculation unit calculates the priority of the user in the packet scheduling based on at least one of CQI information indicating radio state of each mobile station apparatus, QoS information, and information indicating buffer residence amount and buffer residence time.

3. The base station apparatus as claimed in claim 1, wherein the priority correction unit performs correction so as to heighten priority of a user performing discontinuous reception.

4. The base station apparatus as claimed in claim 1, wherein the base station apparatus performs correction of the priority such that the longer the discontinuous reception cycle of a user is, the higher the priority of the user is, based on the discontinuous reception cycle.

5. The base station apparatus as claimed in claim 4, wherein the priority correction unit corrects the priority based on a priority correction amount according to a predetermined discontinuous reception cycle.

6. The base station apparatus as claimed in claim 1, wherein the priority correction unit performs correction so as to heighten priority of a user performing discontinuous reception for measuring a different frequency or a different system to be higher than priority of other users.

7. A packet scheduling method comprising:
a transmitting step of transmitting a control channel including information that indicates presence of data addressed to a mobile station apparatus;
a priority calculation step of calculating priority of a mobile station apparatus in packet scheduling;
a priority correction step of correcting priority calculated in the priority calculation step according to a discontinuous reception state of a mobile station apparatus that receives the control channel discontinuously; and
a scheduling step of determining a mobile station apparatus to which data should be transmitted based on the priority corrected in the priority correction step,
wherein the transmitting step transmits the control channel including information indicating presence of data to a mobile station apparatus that is assigned data transmission by the scheduling step so as to cause the mobile station apparatus to return to a continuous reception state.

8. The packet scheduling method as claimed in claim 7, wherein the priority calculation step comprises calculating the priority of the user in the packet scheduling based on at least one of QoS information, and information indicating buffer residence amount and buffer residence time.

9. The packet scheduling method as claimed in claim 7, wherein the priority correction step comprises performing correction so as to heighten priority of a user performing discontinuous reception.

10. The packet scheduling method as claimed in claim 7, wherein the priority correction step comprises performing correction of the priority such that the longer the discontinuous reception cycle of a user is, the higher the priority of the user is, based on the discontinuous reception cycle.

11. The packet scheduling method as claimed in claim 10, wherein the priority correction step comprises correcting the priority based on a priority correction amount according to a predetermined discontinuous reception cycle.

12. The packet scheduling method as claimed in claim 7, wherein the priority correction step comprises performing correction so as to heighten priority of a user performing discontinuous reception for measuring a different frequency or a different system.

* * * * *